Dec. 15, 1970     H. U. HAUSER-LIENHARD     3,546,868
HAY HARVESTING MACHINES
Filed May 1, 1968                              2 Sheets-Sheet 1
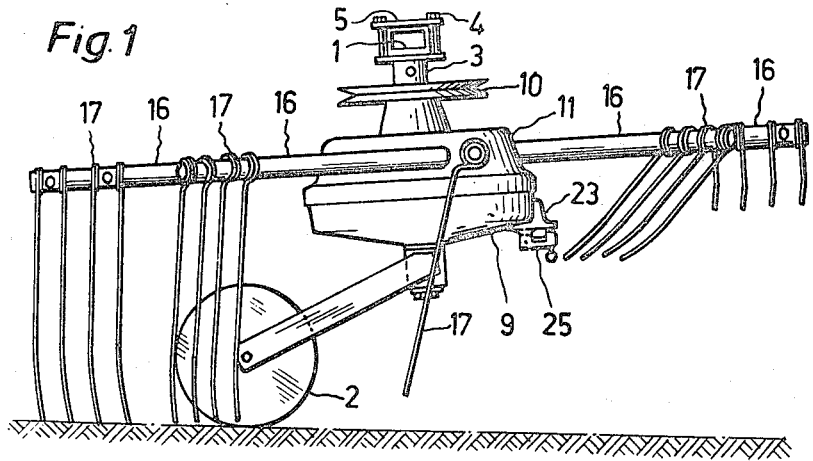
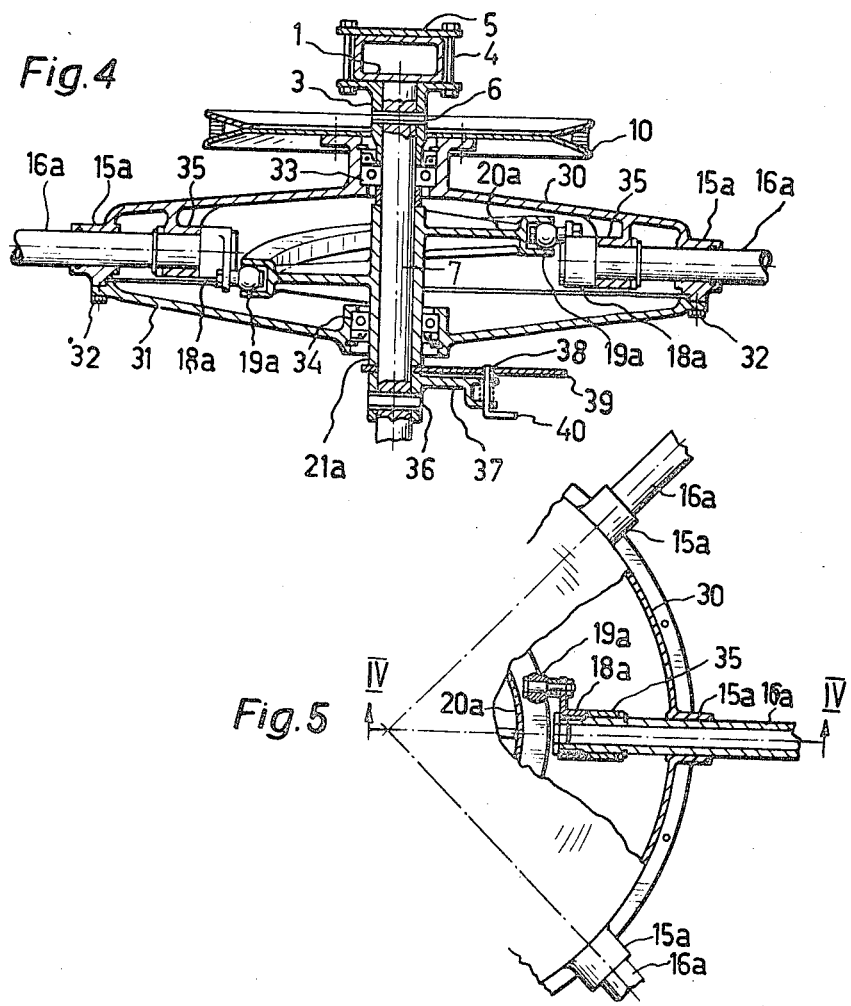
INVENTOR.
Hans Ulrich Hausner-Lienhard
ATTYS.

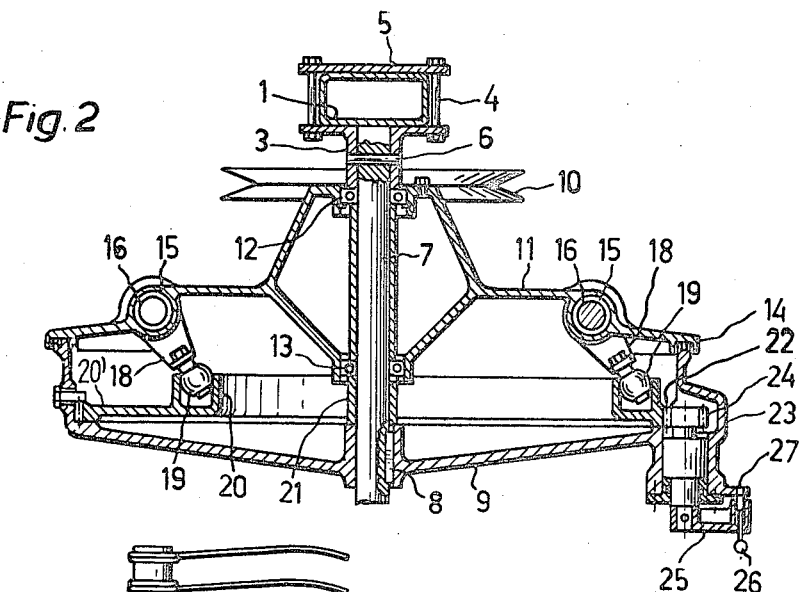
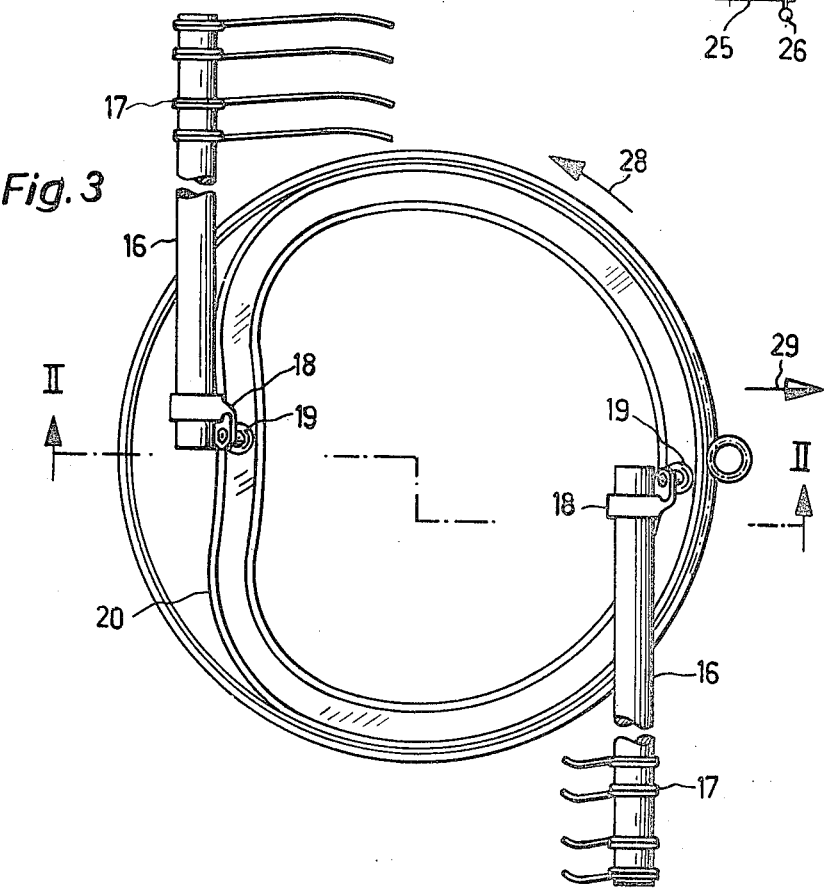

3,546,868
HAY HARVESTING MACHINES
Hans Ulrich Hauser-Lienhard, Watt, Zurich, Switzerland, assignor to Bucher-Guyer AG Maschinenfabrik, Zurich, Switzerland
Filed May 1, 1968, Ser. No. 725,754
Claims priority, application Switzerland, May 5, 1967, 6,365/67
Int. Cl. A01d 77/06
U.S. Cl. 56—377
16 Claims

ABSTRACT OF THE DISCLOSURE

A hay harvesting machine comprises a rake wheel which is rotatably driven about an upright stationary shaft. A hub casing of the wheel carries a plurality of rod-shaped rake prong carriers having their inner ends pivotally mounted in the interior of the casing, while the outer ends projecting from the casing carry rake prongs. A cam track is accommodated within said hub casing and cam track followers are connected with the inner ends of the rake prong carriers to swing the rake prongs into and out of raking position.

---

The invention relates to hay harvesting machines of the kind having a rake wheel rotatably driven about an upright axis and provided with a plurality of rake prong carriers arranged in ray-shape and pivotally movable about their longitudinal axes, the pivoting movement being controlled by means of a cam track during rotation of the rake wheel.

It is an object of the invention to protect the control mechanism of the prong carriers from becoming soiled or clogged by dust, dirt or grass and hay particles.

According to the invention the inner ends of the prong carriers are pivotally mounted in a rotatably driven closed casing containing the said cam track which cooperates by means of cam follower arms with the inner ends of the prong carriers.

The casing containing the control cam may be provided with a bottom part mounted for rotation with said upright axis, and a main part rotatably mounted on the upright axis. In such cases where the hay harvesting machine is used in particularly dusty surroundings, the casing contatining the control cam can be formed in two parts removably connected to each other and which, when assembled, are rotatably mounted as a unit on the upright axis of the rake wheel.

Further objects and details of the invention will be apparent from the following description of two preferred embodiments illustrated by way of example in the accompanying drawings, in which:

FIG. 1 is a side elevation of a rake wheel,

FIG. 2 is a vertical section through the hub casing of the rake wheel, taken along the line II—II of FIG. 3, FIG. 3 is a plan view of the hub casing of the rake wheel, the cover portion and other parts having been omitted, FIG. 4 is a modification of a hub casing of a rake wheel, represented in vertical section along the line IV—IV of FIG. 5, and FIG. 5 is a fragmentary plan view of the hub casing of the rake wheel according to FIG. 4, partially drawn in section.

Referring to FIGS. 1 to 3, the hay harvesting machine has a cross arm 1, on which one or more rake wheels are fixed in a forwardly inclined oblique position and supported on the ground by a ground roller 2. As can be seen in FIGS. 1 and 2, a collar 3 of the rake wheel is detachably connected with the cross arm 1 by means of screws 4 and a flange connection 5. An upright stationary shaft 7 is rigidly connected by means of a bolt 6 to the collar 3, and a lower casing portion 9 is firmly anchored to the upright shaft 7 by means of a key 8. An upper casing portion 11 carrying a V-belt pulley 10 is rotatably mounted on the upright shaft 7 by two bearings 12 and 13 and is supported in liquid-tight manner on the lower casing portion 9 by means of a sealing rim 14, whereby both casing portions 9 and 11 together form an all around closed control casing containing gear lubricant.

The upper casing portion 11 is formed with tangentially directed bearing bores 15 in which the inner ends of prong carriers 16 are rotatably mounted. At their longer ends projecting outwardly from the upper casing portion 11, the prong carriers are provided with rake prongs 17. The inner ends of the prong carriers 16 extending into the interior of the upper casing portion 11 are firmly connected each with a cam follower arm 18 engaging by means of a spherical, rotatable cam follower head 19 a cam track 20 which is formed as an upwardly open U-section channel on an annular disc 20'.

The cam track 20 which is rotatably mounted in the center of the disc 20' by a hub 21 on the upright shaft 7 extends in a horizontal plane substantially at right angles to the upright shaft 7, but has a variable radial distance from the upright shaft 7, the cam track 20 being circular in a major extent, and in a smaller extent it is approximately rectilinear as seen in FIG. 3.

At its circumference, the disc 20' is provided with a gear rim 22 meshing with a gear pinion 24 rotatable in a bearing part 23 of the lower casing portion 9. At its end extending downwardly from the bearing part, the gear pinion 24 carries a crank 25 which is engageable with a hole 27 of the lower casing portion 9 by means of a plug bolt 26. By turning the crank 25 the angular position of the cam track 20 with respect to the inner ends of the prong carriers can be adjusted.

When the upper casing portion 11 is rotatably driven in the direction of the arrow 28, the cam follower arms 18 follow the stationary cam track 20 and turn the associated prong carriers 16 in such manner that the rake prongs 17, in the circular range of the cam track have a rake position directed substantially at right angles towards the ground, and in the rectilinear range of the cam track 20, are pivoted upwardly out of raking action oppositely to the direction of rotation of the rake wheel. When the hay harvesting machine which is pulled in the direction of the arrow 29 only comprises one rake wheel having a comparatively large circle of action, the harvesting goods laying on the ground, such as grass or hay, are raked together to form a windrow along a stretch of ground the width of which substantially corresponds to the diameter of the circle of action of the rake wheel. With the beginning of the upwards pivoting movement of the rake prongs 17, these latter loose their raking action with respect to the harvesting goods, whereby these goods are formed into a windrow laterally of the rake wheel.

For obtaining greater working widths, a hay harvesting machine can also be provided with two or more rake wheels of the kind as described above. In such a hay harvesting machine the rake wheels, which preferably are arranged side by side in a row which is oblique with respect to the direction of travel and rotate in the same direction, cooperate with each other, each rake wheel handing over the raked harvesting goods to the adjacent rake wheel, an unimpeded delivery of the harvesting goods being assured by the rake prong control according to the invention.

Moreover, the rake prong control according to the invention can also be applied to a hay harvesting machine having oppositely rotating rake wheels, a small windrow being formed with such a machine between each two oppositely rotating rake wheels.

In the modification of a rake prong control according to FIGS. 4 and 5 the upright shaft 7 supported on the ground by the ground roller is connected again by the collar 3 and pin 6 with the cross arm 1. An upper casing half 30 and a lower casing half 31 are joined together to be oiltight by means of screws 32 and form together an all around closed hub casing rotatably mounted by radial bearings 33 and 34 on the upright shaft 7. Radially arranged prong carriers 16a are guided by bearing bores 15a and bearing sleeves 35 and carry control arms 18a in the interior of the casing, which arms are engaged in a cam track 20a by means of cam followers 19a. This cam track which is rotatable on the upright shaft 7 by means of a hub 21a, opens radially outwards and is arranged in an oblique plane relatively to the shaft.

An arm 37 is secured by means of a cross pin 36 to the upright shaft 7. An adjusting segment 39 mounted for rotation with the hub 21a is provided with several holes 38 into one or the other of which an adjusting lever 40 can be engaged to hold the segment 39 in different angular positions, whereby the angular position of the cam track 20a can be varied. Means, such as a key 8 (best seen at FIG. 2) or some other suitable adjustment means can be provided for adjusting the cam track 20a in vertical direction. In this manner the normal position of the rake prongs could be additionally adjusted.

I claim:

1. A hay harvesting machine, comprising a rake wheel rotatably mounted on an upright stationary shaft, said rake wheel including a protective casing means, a plurality of rake prong carriers generally radially extending from said shaft, said rake prong carriers being mounted for rotation with said casing means, the rake prong carriers having inner ends pivotally mounted within said casing means and outer ends projecting outwardly of said casing means and carrying rake prongs, an annular cam track within said casing means, and cam follower arms rigidly connected with said inner ends of said rake prong carriers and movable along said cam track for controlling the angular position of said rake prong carriers to move the rake prongs into and out of raking position.

2. A hay harvesting machine according to claim 1, in which said casing means comprises a bottom portion rigidly mounted on said upright shaft and a main portion rotatably mounted on the upright shaft.

3. A hay harvesting machine according to claim 1, in which said casing means consists of two casing halves detachably connected to each other and rotatably mounted as a unit on said upright shaft.

4. A hay harvesting machine according to claim 2, in which the main casing portion is rotatably mounted on the upright shaft and is supported along its circumference by means of a sealing flange on the bottom portion of the casing.

5. A hay harvesting machine according to claim 1, in which the cam track extends in a plane extending substantially at right angles to the upright shaft.

6. A hay harvesting machine according to claim 5, in which the cam track comprises a circular control section concentric with the upright shaft and an approximately rectilinear control section.

7. A hay harvesting machine according to claim 5, in which the cam track has an upwardly open U-channel section.

8. A hay harvesting machine according to claim 1, in which said cam track is concentrical in plan view with the upright shaft but extends at a varying level in axial direction of the shaft.

9. A hay harvesting machine according to claim 8, in which the cam track extends in an oblique plane with respect to the upright shaft.

10. A hay harvesting machine according to claim 8, in which the cam track has a radially outwardly open U-channel section.

11. A hay harvesting machine according to claim 1, in which the prong carriers are mounted in radial arrangement in said hub casing.

12. A hay harvesting machine according to claim 1, in which the prong carriers are mounted to extend tangentially from the hub casing.

13. A hay harvesting machine according to claim 2, in which the cam track is adjustable in circumferential direction about the upright shaft.

14. A hay harvesting machine according to claim 13, in which the cam track is provided at least on a portion of its circumference with gear teeth which mesh with a gear pinion rotatably mounted and fixable in the bottom portion of said casing means.

15. A hay harvesting machine according to claim 13, in which the cam track is adjustable by means of a regulating device into different angular positions with respect to said upright shaft.

16. A hay harvesting machine according to claim 1, in which the position of the cam track can be adjusted in axial direction along said upright shaft.

References Cited

UNITED STATES PATENTS

| 84,257 | 11/1868 | Burt et al. | 56—370 |
| 458,093 | 8/1891 | Boals | 56—370 |

FOREIGN PATENTS

| 450,793 | 4/1968 | Switzerland | 56—370 |
| 458,822 | 8/1968 | Switzerland | 56—370 |
| 458,823 | 8/1968 | Switzerland | 56—370 |
| 459,641 | 9/1968 | Switzerland | 56—370 |

LOUIS G. MANCENE, Primary Examiner

J. A. OLIFF, Assistant Examiner